United States Patent
Noble

(10) Patent No.: US 8,129,482 B2
(45) Date of Patent: *Mar. 6, 2012

(54) METHOD OF PREVENTING OR REDUCING POLYMER AGGLOMERATION ON GRID IN FLUIDIZED-BED REACTORS

(75) Inventor: Larry Allen Noble, Longview, TX (US)

(73) Assignee: Westlake Longview Corporation, Houston, TX (US)

( * ) Notice: Subject to any disclaimer, the term of this patent is extended or adjusted under 35 U.S.C. 154(b) by 731 days.

This patent is subject to a terminal disclaimer.

(21) Appl. No.: 12/038,549

(22) Filed: Feb. 27, 2008

(65) Prior Publication Data

US 2009/0215956 A1  Aug. 27, 2009

(51) Int. Cl.
*C08F 2/00* (2006.01)
*C09B 67/00* (2006.01)
*B01J 8/18* (2006.01)

(52) U.S. Cl. ............ 526/63; 526/62; 526/74; 523/330; 422/139; 422/143

(58) Field of Classification Search .......... 422/143, 422/139; 526/74, 901, 82, 83, 63, 62; 525/258, 525/262, 323; 523/330
See application file for complete search history.

(56) References Cited

U.S. PATENT DOCUMENTS

| | | |
|---|---|---|
| 3,905,900 A | 9/1975 | Gulyas et al. |
| 4,285,910 A | 8/1981 | Kennedy, Jr. |
| 4,533,367 A | 8/1985 | Hadzismajlovic |
| 4,743,431 A | 5/1988 | Brooks |
| 4,858,144 A | 8/1989 | Marsaly et al. |
| 4,956,427 A | 9/1990 | Jenkins, III et al. |
| 5,082,634 A | 1/1992 | Raufast |
| 5,126,414 A | 6/1992 | Cooke et al. |
| 5,158,754 A | 10/1992 | Lefers et al. |
| 5,200,477 A | 4/1993 | Baker et al. |
| 5,306,790 A | 4/1994 | Imabayashi et al. |
| 5,332,553 A | 7/1994 | Hyppanen |
| 5,374,405 A | 12/1994 | Firnberg et al. |
| 5,453,254 A | 9/1995 | Lefers et al. |
| 5,969,061 A | 10/1999 | Wonders et al. |
| 6,090,351 A | 7/2000 | Euzen et al. |
| 6,214,903 B1 | 4/2001 | Eisinger et al. |
| 6,326,191 B2 | 12/2001 | VanToever |
| 6,387,334 B1 | 5/2002 | Krantz et al. |
| 6,476,161 B1 * | 11/2002 | Harlin et al. ............ 526/65 |
| 6,596,824 B2 | 7/2003 | Nambu et al. |
| 6,835,355 B2 | 12/2004 | Guo et al. |
| 6,887,954 B2 | 5/2005 | Maurel |
| 6,911,504 B2 | 6/2005 | Reiling |
| 2003/0202912 A1 | 10/2003 | Myohanen et al. |
| 2004/0194805 A1 | 10/2004 | Reisinger et al. |
| 2005/0047985 A1 * | 3/2005 | Mori et al. ............ 423/335 |
| 2005/0089808 A1 | 4/2005 | Hauzenberger |

FOREIGN PATENT DOCUMENTS

| | | |
|---|---|---|
| EP | 0053355 | 6/1982 |
| EP | 422452 A2 | 4/1991 |
| EP | 735058 | 2/1996 |
| GB | 1513152 | 6/1978 |
| GB | 2103329 | 2/1983 |
| JP | 55106536 | 8/1980 |
| JP | 63020031 | 1/1988 |
| JP | 02090935 | 3/1990 |
| WO | 9714721 | 4/1997 |

OTHER PUBLICATIONS

"Silica" A-Z Materials. CERAM Research Ltd, 2000.*

* cited by examiner

*Primary Examiner* — Vasu Jagannathan
*Assistant Examiner* — Hannah Pak
(74) *Attorney, Agent, or Firm* — Phan Law Group PLLC

(57) ABSTRACT

A process for preventing or reducing polymer agglomeration and/or accumulation on or around the gas distribution grid in an olefin polymerization, fluidized-bed reactor. The process involves introducing one or more scouring balls into the reactor above the gas distribution grid, and carrying out olefin polymerization in the presence of the scouring balls. Also disclosed is a process for polymerizing olefins in a fluidized-bed reactor with reduced polymer agglomeration and/or accumulation on the gas distribution grid.

9 Claims, No Drawings

METHOD OF PREVENTING OR REDUCING POLYMER AGGLOMERATION ON GRID IN FLUIDIZED-BED REACTORS

FIELD OF THE INVENTION

The invention generally relates to a method of preventing or reducing polymer agglomeration and accumulation on or around the gas distribution grid in a fluidized-bed reactor. The invention also generally relates to a process for polymerizing olefins in a fluidized-bed reactor with reduced polymer agglomeration and accumulation on or around the gas distribution grid.

BACKGROUND OF THE INVENTION

In olefin-polymerization, fluidized-bed reactors, there is a tendency for polymer particles to agglomerate (i.e., to stick or fuse together to form larger masses) and deposit on top of and/or around the gas distribution grid inside the reactor.

Such agglomeration and accumulation of polymer masses can block the flow of the fluidizing gas. When the fluidizing gas flow is blocked, the fluidized bed can become unstable and collapse. In which case, the reactor would have to be shut down and cleaned. Also, when temperature sensors near the grid behave abnormally, the reactor would typically have to be shut down as well. Frequent reactor shutdowns are undesirable as they can delay production and increase the cost of running the reactor. Thus, there is a need to prevent or reduce polymer agglomeration and/or accumulation on top of and/or around the gas distribution grid in a fluidized-bed reactor.

The present invention provides a solution for solving this problem.

SUMMARY OF THE INVENTION

In one aspect, the invention provides a process for polymerizing one or more olefins in a fluidized-bed reactor comprising a gas distribution grid. The process comprises:

introducing one or more scouring balls into the reactor above the gas distribution grid; and carrying out olefin polymerization in the presence of said scouring balls.

In another aspect, the invention provides a method for preventing or inhibiting polymer agglomeration and/or accumulation on or around a gas distribution grid in a fluidized-bed reactor. The method comprises:

introducing one or more scouring balls into the reactor above the gas distribution grid; and carrying out olefin polymerization in the presence of said scouring balls.

DETAILED DESCRIPTION OF THE INVENTION

The present inventor has surprisingly found that polymer agglomeration and/or accumulation including so-called "waffling" on top of and/or around the gas distribution grid in a fluidized-bed, olefin polymerization reactor can effectively be reduced, prevented, and/or inhibited by carrying out the polymerization in the presence of one or more scouring balls located in the reactor above the gas distribution grid.

Thus, in one aspect, the invention provides a process for polymerizing one or more olefins in a fluidized-bed reactor comprising a gas distribution grid. The process comprises:

introducing one or more scouring balls into the reactor above the gas distribution grid; and carrying out olefin polymerization in the presence of said scouring balls.

In another aspect, the invention provides a method for preventing or reducing polymer agglomeration and/or accumulation on or around a gas distribution grid in a fluidized-bed reactor. The method comprises:

introducing one or more scouring balls into the reactor above the gas distribution grid; and carrying out olefin polymerization in the presence of said scouring balls.

By "scouring balls," it is meant any object that is substantially inert, substantially non-fluidizable, and laterally movable under polymerization conditions. The words "scouring" and "balls" themselves do not necessarily imply any particular action or shape in the context of the invention. According to the invention, the scouring balls can vary in size, shape, and density over a wide range so long as they do not become fluidized under polymerization conditions, but rather reside primarily on or slightly above the grid.

Preferably, the balls have rounded edges to facilitate their lateral movement. Exemplary shapes for the balls include spherical or substantially spherical, oblong, or even disk-like. They can be solid or hollow.

Preferably, the balls are substantially spherical and have a size, hardness, and density such that the fluidizing gas can make them roll around and/or bounce up-and-down on top of the grid to break up and/or prevent the formation and/or accumulation of polymer agglomerates during polymerization. Also, preferably, the size, shape, and density of the balls are such that the balls cause minimal disruption to the fluidization, by leaving the grid holes as unobstructed as possible as they move.

The individual balls can have different sizes, shapes, and densities from each other. In one preferred embodiment, multiple balls are used having varying sizes, shapes, and densities so as to maximize the amount of scouring in any given area per unit of time.

The balls can be made of any material, such as wood, metal, plastic, ceramic, or combinations thereof, so long as they are substantially inert under reaction conditions. In one embodiment, the balls are substantially spherical, have a diameter ranging from 8 to 10 inches, and are made of plastic. In a preferred embodiment, the balls are made from a linear low density polyethylene having a melt index of about 0.5 and a density of about 0.926 g/cc. The balls preferably weigh about 9 to 18 lbs each. Such balls are extremely hard and durable under polymerization conditions.

The scouring balls can even be made of polymer agglomerates that are obtained from prior polymerization runs and intentionally placed or left in the reactor before polymerization is resumed.

The scouring balls may be introduced into the fluidized-bed reactor at anytime that is safe and via any port, existing or newly created. Preferably, the balls are introduced through a "man-way" in the reactor before polymerization begins by placing them on a clean gas distribution grid prior to the seed bed being loaded.

The polymerization process of the present invention may be carried out using any gas-phase, fluidized-bed polymerization reactor. This type reactor and means for operating the reactor are well known and described in the literature such as U.S. Pat. Nos. 3,709,853; 4,003,712; 4,011,382; 4,302,566; 4,543,399; 4,882,400; 5,436,304; and 5,541,270; Canadian Patent No. 991,798; and Belgian Patent No. 839,380. These patents disclose gas-phase polymerization processes wherein the polymerization medium is fluidized by the continuous flow of the gaseous monomer and diluent. The entire contents of these patents are incorporated herein by reference.

In general, the fluidized-bed reactor for use in the process of the present invention typically comprises a gas distribution grid, a reaction zone, and a so-called velocity reduction zone. The reaction zone comprises a bed of growing polymer particles, formed polymer particles, and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experimentation. Make-up gaseous monomer may be added to the circulating gas stream at a rate equal to the rate at which particulate polymer product and monomer associated therewith is withdrawn from the reactor, and the composition of the gas passing through the reactor is adjusted to maintain an essentially steady-state gaseous composition within the reaction zone. The gas leaving the reaction zone is passed to the velocity reduction zone where entrained particles are removed. Finer entrained particles and dust may be removed in a cyclone and/or fine filter. The gas can be passed through a heat exchanger to remove the heat of polymerization, compressed in a compressor, and then returned to the reaction zone.

The fluidized-bed reactor temperature can range from about 30° C. to about 150° C. In general, the reactor temperature is operated at the highest temperature that is feasible taking into account the sintering temperatures of the polymer product within the reactor.

The process of the present invention is suitable for the polymerization of at least one or more olefins. The olefins, for example, may contain from 2 to 16 carbon atoms. Included herein are homopolymers, copolymers, terpolymers, and the like of the olefin monomeric units. Particularly preferred for preparation herein by the process of the present invention are polyethylenes. Such polyethylenes can be homopolymers of ethylene and copolymers of ethylene and at least one alpha-olefin wherein the ethylene content is at least about 50% by weight of the total monomers involved. Exemplary alpha-olefins that may be utilized herein are propylene, 1-butene, 1-pentene, 1-hexene, 1-heptene, 1-octene, 4-methyl-1-pentene, 1-decene, 1-dodecene, 1-hexadecene, and the like. Also utilizable herein are polyenes such as 1,3-hexadiene, 1,4-hexadiene, 1,5-hexadiene, cyclopentadiene, dicyclopentadiene, 4-vinylcyclohex-1-ene, 1,5-cyclooctadiene, 5-vinylidene-2-norbornene, 5-vinyl-2-norbornene, and olefins formed in situ in the polymerization medium. When olefins are formed in situ in the polymerization medium, the formation of polyethylenes containing long chain branching may occur.

In the present invention, any catalyst for polymerizing olefins may be used. Preferably, the olefin polymerization catalyst comprises at least one metal selected from Groups 3, 4, 5, 6, 7, 8, 9, 10, 11, 12 and 13 of the Periodic Table of the Elements, as defined herein. Exemplary metals are titanium, zirconium, vanadium, iron, chromium, nickel and aluminum. The olefin polymerization catalyst may be neutral or cationic.

Exemplary of such polymerization catalysts are:

1. Any compound containing a Group 6 element. Preferred are chromium containing compounds. Exemplary are chromium oxide catalysts which polymerize ethylene to high molecular weight high density polyethylenes (HDPE) having a broad molecular weight distribution. These catalysts are typically based on Cr(6+) and are supported on a carrier. Further exemplary are organochromium catalysts such as bis(triphenylsilyl)chromate supported on silica and activated with organoaluminum compounds, and bis(cyclopentadienyl)chromium supported on silica.

2. Ziegler-Natta catalysts which typically consist of a transition metal component and an organometallic co-catalyst that is typically an organoaluminum compound.

3. An olefin polymerization catalyst that polymerizes olefins to produce interpolymers of olefins having a molecular weight distribution (MWD) of from 1 to 2.5.

4. Metallocene catalysts which consist of a transition metal component having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and an organometallic co-catalyst that is typically alkyl aluminoxane, such as methyl aluminoxane, or an aryl substituted boron compound.

5. Any compound containing a Group 13 element. Preferred are aluminum containing compounds. Exemplary are catalysts of the type described in U.S. Pat. No. 5,777,120, such as cationic aluminum alkyl amidinate complexes with an organometallic co-catalyst that is typically alkylaluminoxane, such as methylaluminoxane, or an aryl substituted boron containing compound.

6. Any compound containing a Group 10 element. Preferred are nickel containing compounds. Exemplary are catalysts of the type described in U.S. Pat. No. 5,866,663, such as cationic nickel alkyl diimine complexes with an organometallic co-catalyst that is typically alkylaluminoxane, such as methylaluminoxane, or an aryl substituted boron containing compound. Further exemplary are catalysts of the type described in Organometallics, 1998, Volume 17, pages 3149-3151, such as neutral nickel alkyl salicylaldiminato complexes.

7. Any compound containing a Group 8 element. Preferred are iron containing compounds. Exemplary are catalysts of the type described in the Journal of the American Chemical Society, 1998, Volume 120, pages 7143-7144, such as cationic iron alkyl pyridinebisimine complexes with an organometallic co-catalyst that is typically alkylaluminoxane, such as methylaluminoxane, or an aryl substituted boron containing compound.

8. Any compound containing a Group 4 element. Preferred are titanium and zirconium containing compounds. Exemplary are catalysts of the type described in the Journal of the American Chemical Society, 1996, Volume 118, pages 10008-10009, such as cationic titanium alkyl diamide complexes with an organometallic co-catalyst that is typically alkylaluminoxane, such as methylaluminoxane, or an aryl substituted boron containing compound.

The above catalysts are, or can be, supported on inert porous particulate carriers.

The above olefin polymerization catalysts can be introduced in the process of the present invention in any manner. For example, the catalyst component(s) can be introduced directly into the polymerization medium in the form of a solution, a slurry or a dry free flowing powder. The catalyst if requiring a co-catalyst can be premixed to form an activated catalyst prior to addition to the polymerization medium, or the components can be added separately to the polymerization medium, or the components can be premixed and then contacted with one or more olefins to form a prepolymer and then added to the polymerization medium in prepolymer form. When the catalyst components are premixed prior to introduction into the reactor, any electron donor compound may be added to the catalyst to control the level of activity of the catalyst. Furthermore, during the polymerization reaction being carried out in the presence of the olefin polymerization catalyst, as above described, there may be added additional organometallic compound(s). The additional organometallic compounds may be the same or different from that used as co-catalyst.

Any or all of the components of the olefin polymerization catalysts can be supported on a carrier. The carrier can be any particulate organic or inorganic material. Preferably the carrier particle size should not be larger than about 200 microns in diameter. The most preferred particle size of the carrier material can be easily established by experiment. Preferably, the carrier should have an average particle size of 5 to 200 microns in diameter, more preferably 10 to 150 microns and most preferably 20 to 100 microns.

Examples of suitable inorganic carriers include metal oxides, metal hydroxides, metal halogenides or other metal salts, such as sulphates, carbonates, phosphates, nitrates, and silicates. Exemplary of inorganic carriers suitable for use herein are compounds of metals from Groups 1 and 2 of the Periodic Table of the Elements, such as salts of sodium or potassium and oxides or salts of magnesium or calcium, for instance the chlorides, sulfates, carbonates, phosphates or silicates of sodium, potassium, magnesium or calcium and the oxides or hydroxides of, for instance, magnesium or calcium. Also suitable for use are inorganic oxides such as silica, titania, alumina, zirconia, chromia, boron oxide, silanized silica, silica hydrogels, silica xerogels, silica aerogels, and mixed oxides such as talcs, silica/chromia, silica/chromia/titania, silica/alumina, silica/titania, silica/magnesia, silica/magnesia/titania, aluminum phosphate gels, silica co-gels and the like. The inorganic oxides may contain small amounts of carbonates, nitrates, sulfates and oxides such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, and $Li_2O$. Carriers containing at least one component selected from the group consisting of $SiO_2$, $Al_2O_3$ or mixtures thereof as a main component are preferred.

Examples of suitable organic carriers include polymers such as, for example, polyethylene, polypropylene, interpolymers of ethylene and alpha-olefins, polystyrene, and functionalized polystyrene.

The Ziegler-Natta catalysts utilized herein are well known in the industry. The Ziegler-Natta catalysts in the simplest form are comprised of a component comprising at least one transition metal and a co-catalyst comprising at least one organometallic compound. The metal of the transition metal component is a metal selected from Groups 4, 5, 6, 7, 8, 9 and/or 10 of the Periodic Table of the Elements, as published in "Chemical and Engineering News", 63(5), 27, 1985. In this format, the groups are numbered 1-18. Exemplary of such transition metals are titanium, zirconium, vanadium, chromium, manganese, iron, cobalt, nickel, and the like, and mixtures thereof. In a preferred embodiment the transition metal is selected from the group consisting of titanium, zirconium, vanadium and chromium, and in a still further preferred embodiment, the transition metal is titanium. The Ziegler-Natta catalyst can optionally contain magnesium and/or chlorine. Such magnesium and chlorine containing catalysts may be prepared by any manner known in the art.

The co-catalyst can be any organometallic compound, or mixtures thereof, that can activate the transition metal component in a Ziegler-Natta catalyst in the polymerization of olefins. In particular, the organometallic co-catalyst compound that is reacted with the transition metal component contains a metal selected from Groups 1, 2, 11, 12, 13 and/or 14 of the above described Periodic Table of the Elements. Exemplary of such metals are lithium, magnesium, copper, zinc, boron, silicon and the like, or mixtures thereof.

Typically, the co-catalyst is an organoaluminum compound such as, for example, trimethylaluminum and triethylaluminum.

Furthermore, there may be added to the Ziegler-Natta catalysts any internal electron donor. The internal electron donor compound can be selected from the group consisting of ethers, thioethers, esters, thioesters, amines, amides, ketones, nitrites, phosphines, silanes, acid anhydrides, acid halides, acid amides, aldehydes, and organic acid derivatives. Internal electron donors also include compounds containing from 1 to 50 carbon atoms and from 1 to 30 heteroatoms of an element, or mixtures thereof, selected from Groups 14, 15, 16 and 17 of the Periodic Table of Elements.

In carrying out the polymerization process of the present invention, an external electron donor may be used. Exemplary external electron donors include tetrahydrofuran, diethyl ether, dipropyl ether, diisopropyl ether, dibutyl ether, dioctyl ether, tert-butyl methyl ether, trimethylene oxide and tetrahydropyran. The external electron donor may be added to the preformed catalyst, to the prepolymer during the prepolymerization step, to the preformed prepolymer and/or to the polymerization medium. The external electron donor may optionally be premixed with the co-catalyst. The external electron donor can be added in any amount sufficient to effect production of the desired polyolefin. The external electron donor can be used in a molar ratio of external electron donor to transition metal component of the Ziegler-Natta catalyst ranging from about 0.01:1 to about 100:1. In another embodiment, the molar ratio of external electron donor to transition metal component ranges from about 0.1:1 to about 50:1.

The Ziegler-Natta catalyst may be prepared by any method known in the art. The catalyst can be in the form of a solution, a slurry or a dry free flowing powder. The amount of Ziegler-Natta catalyst used is that which is sufficient to allow production of the desired amount of the polyolefin.

Metallocene catalysts are well known in the industry and are typically comprised of a transition metal component and a co-catalyst. The transition metal component has at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane. The transition metal is selected from Groups 3, 4, 5, 6, 7, 8, 9 and 10 of the Periodic Table of the Elements. Exemplary of such transition metals are titanium, zirconium, hafnium, vanadium, chromium, manganese, iron, cobalt, nickel, and the like, and mixtures thereof. In an embodiment, the transition metal is selected from Groups 4, 5 or 6 such as, for example, titanium, zirconium, hafnium, vanadium and chromium, and in a still further embodiment, the transition metal is titanium or zirconium or mixtures thereof.

The co-catalyst component of the metallocene catalyst can be any compound, or mixtures thereof, that can activate the transition metal component of the metallocene catalyst in olefin polymerization. Typically, the co-catalyst is an alkylaluminoxane such as, for example, methylaluminoxane (MAO) and aryl substituted boron compounds such as, for example, tris(perfluorophenyl)borane and the salts of tetrakis(perfluorophenyl)borate.

There are many references describing metallocene catalysts in great detail. For example, metallocene catalyst are described in U.S. Pat. Nos. 4,564,647; 4,752,597; 5,106,804;

5,132,380; 5,227,440; 5,296,565; 5,324,800; 5,331,071; 5,332,706; 5,350,723; 5,399,635; 5,466,766; 5,468,702; 5,474,962; 5,578,537; and 5,863,853.

In carrying out the polymerization process of the present invention, the co-catalyst(s), if utilized, is added to the polymerization medium in any amount sufficient to effect production of the desired polyolefin. The co-catalyst(s) can be used in a molar ratio of co-catalyst(s) to metal component(s) of the olefin polymerization catalyst ranging from about 0.5:1 to about 10000:1. In another embodiment, the molar ratio of co-catalyst(s) to metal component(s) ranges from about 0.5:1 to about 1000:1.

In carrying out the polymerization process of the present invention, an ether may be used to reduce the electrostatic charge in the polymerization medium. Exemplary ethers include tetrahydrofuran, diethyl ether, dipropyl ether, diisopropyl ether, dibutyl ether, dioctyl ether, tert-butyl methyl ether, trimethylene oxide, and tetrahydropyran. The ether may be added to the preformed catalyst, to the prepolymer during the prepolymerization step, to the preformed prepolymer, and/or to the polymerization medium. The ether may optionally be premixed with the co-catalyst when utilized. The ether is added in any amount sufficient to reduce the electrostatic charge in the polymerization medium to a level lower than would occur in the same polymerization process in the absence of the ether. The ether can be used in a molar ratio of compound to metal component of the olefin polymerization catalyst ranging from about 0.001:1 to about 100:1. In another embodiment, the molar ratio of the ether to metal component ranges from about 0.01:1 to about 50:1.

In carrying out the polymerization process of the present invention, a halogenated hydrocarbon may be added to the polymerization medium in any amount sufficient to effect production of the desired polyolefin. Typical of such halogenated hydrocarbons are monohalogen and polyhalogen substituted saturated or unsaturated aliphatic, alicyclic, or aromatic hydrocarbons having 1 to 12 carbon atoms. Exemplary halogenated hydrocarbons for use in the process of the present invention include dichloromethane, chloroform, carbon tetrachloride, chlorofluoromethane, chlorodifluoromethane, dichlorodifluoromethane, fluorodichloromethane, chlorotrifluoromethane, fluorotrichloromethane and 1,2-dichloroethane. The halogenated hydrocarbon can be used in a molar ratio of halogenated hydrocarbon to metal component of the olefin polymerization catalyst ranging from about 0.001:1 to about 100:1. In another embodiment, the molar ratio of halogenated hydrocarbon to metal component ranges from about 0.001:1 to about 10:1.

The molecular weight of the polyolefin produced by the present invention can be controlled in any known manner, for example, by using hydrogen. The molecular weight control of polyethylene, for example, may be evidenced by an increase in the melt index (I2) of the polymer when the molar ratio of hydrogen to ethylene in the polymerization medium is increased.

Any conventional additive may be added to the polyolefins obtained by the present invention. Examples of the additives include nucleating agents, heat stabilizers, antioxidants of phenol type, sulfur type and phosphorus type, lubricants, antistatic agents, dispersants, copper harm inhibitors, neutralizing agents, foaming agents, plasticizers, anti-foaming agents, flame retardants, crosslinking agents, flowability improvers such as peroxides, ultraviolet light absorbers, light stabilizers, weathering stabilizers, weld strength improvers, slip agents, anti-blocking agents, antifogging agents, dyes, pigments, natural oils, synthetic oils, waxes, fillers, and rubber ingredients.

The polyolefins, particularly polyethylenes, of the present invention may be fabricated into films by any technique known in the art. For example, films may be produced by the well known cast film, blown film and extrusion coating techniques.

Further, the polyolefins, particularly polyethylenes, may be fabricated into other articles of manufacture, such as molded articles, by any of the well known techniques.

This invention can be further illustrated by the following examples of preferred embodiments thereof, although it will be understood that these examples are included merely for purposes of illustration and are not intended to limit the scope of the invention.

EXAMPLES

Comparative Example 1

For 17 days, a commercial fluidized-bed, ethylene polymerization reactor was operated with no balls. The run was conducted under typical polymerization conditions in all respects, preceded by manned entry into the reactor in order to remove all material (loose powder, agglomerates, etc.) from the grid and to unplug any plugged grid holes. Three different reactor grades of polyethylene were produced (Melt Index/Density –0.5 MI/0.9160 g/cc, 1.0 MI/0.9190 g/cc, and 0.6 MI/0.9250 g/cc).

The run was characterized by very little temperature spiking of "grid TIs" (internal thermocouples near grid level, with spiking being a sign of moving agglomerates), but experienced severe grid TI "wandering," a phenomenon in which these thermocouples run considerably colder than expected (due to abnormal flow patterns of cold inlet gas). This type of "wandering" grid TI behavior has come to be associated particularly with polymer buildup on the surface of the grid and the surrounding wall surface around the grid perimeter.

On Day 18, the reactor was shutdown for prior scheduled maintenance.

The reactor grid was inspected on Day 19, and found to have a thick layer of polymer (1" to 4") built up on approximately 70% of the grid, as well as a buildup on the surrounding wall surface. No loose agglomerates were found. The polymer buildup was removed with some degree of difficulty, because it tightly adhered to the reactor surfaces.

Example 1

For 16 days, the same reactor as in Comparative Example 1 was operated with 10 substantially spherical balls and 7 agglomerates intentionally placed on the grid prior to startup. Five 8" and five 10" balls were used; the agglomerates were of similar size and had a generally rounded shape. The balls were made from linear low density polyethylene having a melt index of 0.5 and a density of 0.926 g/cc. The balls weighed from 9 to 18 lbs each.

This run was similar to the run in Comparative Example 1, making the same 3 polyethylene formulas in the same order. The run was characterized by very slight temperature spiking of the grid TIs (interpreted to be due to the presence and movement of these balls) and no grid TI wandering.

The reactor was shutdown on Day 16 in order to perform maintenance on a plugged filter.

On entering the reactor on Day 17, 10 balls and 5 agglomerates were found intact (2 agglomerates apparently broke up and exited via the withdrawal system). The grid and surrounding wall were completely free of any buildup, with only a very small amount (1" to 2" wide strip) of buildup being found in the "crevice" where the grid meets the reactor wall, in an area too small for the balls to touch.

The invention has been described in detail with particular reference to preferred embodiments thereof, but it will be understood that variations and modifications can be effected within the spirit and scope of the invention.

I claim:

1. A process for polymerizing one or more olefins in a fluidized-bed reactor comprising a gas distribution grid, said process comprising:
   introducing one or more scouring balls into the reactor above the gas distribution grid; and
   carrying out olefin polymerization in the presence of said scouring balls.

2. The process according to claim 1, wherein said olefins comprise ethylene.

3. The process according to claim 1, wherein said olefins comprise ethylene and one or more $C_3$-$C_{10}$ α-olefins.

4. The process according to claim 1, wherein said scouring balls are substantially spherical.

5. The process according to claim 1, which comprises introducing two or more scouring balls into the reactor, and said scouring balls have different shapes, sizes, or both.

6. A method for preventing or reducing polymer agglomeration and/or accumulation on or around a gas distribution grid in a fluidized-bed reactor, said method comprising:
   introducing one or more scouring balls into the reactor above the gas distribution grid; and
   carrying out olefin polymerization in the presence of said scouring balls.

7. The method according to claim 6, wherein said scouring balls are substantially spherical.

8. The method according to claim 6, which comprises introducing two or more scouring balls into the reactor, and said scouring balls have different shapes, sizes, or both.

9. The method according to claim 6, wherein said scouring balls are made of wood, metal, plastic, ceramic, or combinations thereof.

* * * * *